United States Patent [19]

Jasne

[11] Patent Number: 4,731,408
[45] Date of Patent: Mar. 15, 1988

[54] PROCESSABLE CONDUCTIVE POLYMERS

[75] Inventor: Stanley J. Jasne, Andover, Mass.

[73] Assignee: Polaroid Corporation, Cambridge, Mass.

[21] Appl. No.: 811,281

[22] Filed: Dec. 20, 1985

[51] Int. Cl.$^4$ .............................................. C08F 39/04
[52] U.S. Cl. .................................. 524/458; 252/511; 524/460; 524/516
[58] Field of Search ............... 524/458, 459, 460, 521, 524/516, 517, 500, 501; 252/511

[56] References Cited

U.S. PATENT DOCUMENTS

| | | | |
|---|---|---|---|
| 3,686,109 | 8/1972 | Aldrich | 524/521 |
| 3,867,330 | 2/1975 | Frisque | 524/521 |
| 3,947,396 | 3/1976 | Kangas | 524/521 |
| 4,237,194 | 12/1980 | Upson et al. | 428/424.2 |
| 4,517,333 | 5/1985 | Lundberg | 524/521 |
| 4,552,927 | 11/1985 | Warren | 525/279 |
| 4,554,212 | 11/1985 | Diefenbach | 524/458 |
| 4,567,250 | 1/1986 | Naarman et al. | 528/423 |

FOREIGN PATENT DOCUMENTS

| | | |
|---|---|---|
| 3307954 | 9/1984 | Fed. Rep. of Germany . |
| 3325892 | 1/1985 | Fed. Rep. of Germany . |
| 2124635 | 2/1984 | United Kingdom . |
| 2134125 | 8/1984 | United Kingdom . |

OTHER PUBLICATIONS

A. F. Diaz, et al., Organic Coatings and Plastics Chemistry, vol. 43, pp. 774–776, 1980.
J. Frommer, Industrial Chemical News, vol. 4, No. 10, Oct. 1983.

*Primary Examiner*—Paul R. Michl
*Attorney, Agent, or Firm*—Louis G. Xiarhos

[57] ABSTRACT

Processable conductive polymers prepared by an oxidative polymerization are disclosed. A monomer which is oxidatively polymerizable into an electrically conductive polymer is polymerized with the aid of a chemical oxidizing agent in a reaction medium containing a dispersed phase of a polymeric counterion having anionic surface character. The polymeric counterion, which is in affiliation with the oxidatively polymerized polymer, confers processability to the conductive polymer material.

25 Claims, No Drawings

PROCESSABLE CONDUCTIVE POLYMERS

BACKGROUND OF THE INVENTION

This invention relates to the production of conductive organic polymers. More particularly, it relates to processable conductive organic polymers and to a method for their production.

Considerable effort has been expended by researchers toward the production of polymers which exhibit electrical conductivity. For example, in ORGANIC COATINGS AND PLASTICS CHEMISTRY, Vol. 43, pp. 774–6, Preprints of Papers Presented by the Division of Organic Coatings and Plastics Chemistry at the American Chemical Society 180th National Meeting, San Francisco, Calif., Aug. 24–29, 1980, there is reported by A. F. Diaz et al., in the paper "Electrosynthesis and Study of Conducting Polymeric Films", the electropolymerization of pyrrole, using a variety of electrolyte salts as counteranions. In Offenlegungsschrift DE No. 3325892 A1 (published Jan. 31, 1985), there is disclosed a method for the production of fine-grain pyrrole polymers by the treatment of pyrrole with an oxygen-containing oxidation agent in solution in the presence of a conducting salt. A summary of various approaches to the creation of electrically conducting polymers is reported, for example, by J. Frommer, in "Polymer Research Frontier: How Insulators Become Conductors", Industrial Chemical News, Vol. 4, No. 10, October 1983.

Polymeric materials which have been proposed as conductive polymers, for the most part, are characterized by one or more undesirable properties, including instability under ambient conditions, poor physical integrity (notably brittleness) and poor processability (insolubility or intractability) severely limiting the production or fabrication of conductive polymeric articles by conventional production or processing techniques.

While various applications for conductive polymers have been proposed, for example, in the manufacture of solar cells and batteries and for EMI shielding, the physical properties and/or processability of a conductive polymeric material will dictate in part the suitability of such materials to particular applications. In my copending application "Processable Conductive Polymers", U.S. Ser. No. 595,667, filed Apr. 2, 1984, there is disclosed and claimed a processable electrically conductive organic material and a method for the production of such polymer. The conductive organic polymer, exhibiting improved flexibility and processability, including coatability from solvents, is prepared by the electropolymerization of an electropolymerizable monomer in the presence of a dispersed phase of polymeric electrolyte having anionic surface character (e.g., a polymeric latex having anionic surface character). While the conductive polymer material can be processed by convenient coating methods into electrically conductive films, it will be appreciated that it would be advantageous to prepare processable electrically conductive polymers by a method which is not dependent upon the manufacturing and equipment limitations associated, in general, with electrochemical methods.

SUMMARY OF THE INVENTION

It has been found that a processable electrically conductive organic polymeric material can be provided by polymerizing an oxidatively polymerizable monomer in a reaction medium containing an oxidizing agent for the oxidative polymerization and a dispersed phase of polymeric counterion having anionic surface character. The utilization of an oxidizing agent to effect the oxidative polymerization, and employment of a polymeric counterion in affiliation with the cationic charges of the oxidatively polymerized monomer, permits the production of an electrically conductive polymeric material that exhibits stability, good physical integrity and which can be processed by conventional coating techniques.

In its method aspect, there is provided a method for the production of a processable electrically conductive organic polymer as aforedescribed, which method comprises oxidatively polymerizing, in a polymerization reaction medium, a monomer oxidatively polymerizable to a cationic polymer, said reaction medium comprising a reaction mediumsoluble chemical oxidizing agent for the oxidative polymerization and, in a dispersed phase in the reaction medium during the oxidative polymerization and as a counteranion for said cationic polymer, a polymer having anionic surface character.

For a fuller understanding of the present invention, reference should be made to the following detailed description.

DETAILED DESCRIPTION

The oxidative polymerization reaction employed in the production of the conductive polymers of the invention can be performed on a variety of oxidatively polymerizable monomeric compounds. Useful monomers are those which can be oxidatively polymerized, in the presence of a suitable counteranion material, to a polymer having a cationic character, either as a partial or full charge. In general, the oxidatively polymerizable monomer will exhibit solubility in the reaction medium (solvent) and will be soluble at least to the extent of $10^{-5}$ Molar. Preferably, the polymerizable monomer will be dissolved in the reaction medium at a concentration of from $10^{-2}$ to $10^{-1}$ Molar, although the concentration utilized will depend upon the particular nature of the polymerizable compound and reaction solvent employed and the desired rate of polymerization.

Suitable oxidatively polymerizable monomers useful in the method of the present invention are aromatic heterocyclic compounds. Examples include pyrrole; N-substituted pyrroles; β-substituted pyrroles; thiophene; β-substituted thiophenes; furan; β-substituted furans; indole; and carbazole. If desired, aniline salts, e.g., aniline hydrochloride, can be employed to provide a conductive polyaniline. Other monomers oxidatively polymerizable to a polymer having a cationic character can, however, be employed. The polymerizable monomer can be polymerized to a homopolymer or can be copolymerized with one or more oxidatively polymerizable monomers to provide an electrically conductive copolymer, if desired.

The oxidatively polymerizable monomer useful in the production of polymers of this invention can be substituted with one or more substituent groups. In the case of a five-membered heterocyclic compound, the $\alpha,\alpha'$-positions will be unsubstituted so as to permit $\alpha,\alpha'$-coupling of monomeric units in a polymer chain. It will be appreciated that the presence of substituent groups will influence the rate of oxidation (polymerization) or the properties of the resulting polymer. Suitable substituent groups include alkyl, aryl, aralkyl, alkaryl, hydroxy, methoxy, chloro, bromo and nitro substituents. Suitable substituent groups can be selected consistent with the desired polymerization conditions and the properties desired in the resulting conductive polymer.

A class of aromatic heterocyclic compounds suited to the production of conductive polymers by the method of the invention includes the five-membered heterocyclic compounds having the formula

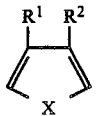

wherein each of $R^1$ $R^2$ independently hydrogen; alkyl (e.g., methyl or ethyl); aryl (e.g., phenyl); alkaryl (e.g. tolyl); or aralkyl (e.g., benzyl); or $R^1$ and $R^2$ together comprise the atoms necessary to complete a cyclic (e.g. benzo) structure; and X is

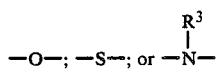

where $R^3$ is hydrogen, alkyl, aryl, alkaryl or aralkyl. These compounds provide in the resulting oxidatively polymerized material, repeating units of the formula

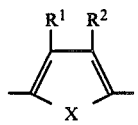

wherein $R^1$, $R^2$ have the definitions set forth hereinbefore.

Preferred monomers include pyrrole and the substituted pyrroles such as $\beta$-$\beta'$-dimethylpyrrole and $\beta$-$\beta'$-diphenylpyrrole. The polymerizable monomer of choice is pyrrole which polymerizes readily and which in affiliation with a polyanionic counterion permits the facile production of an electrically conductive polymeric material characterized by stability and processability.

The oxidative polymerization is effected in a suitable polymerization reaction medium with the aid of an oxidizing agent. The polymerization medium will comprise suitable solvent material for the oxidatively polymerizable monomer. Typically water will be employed as a reaction medium, although mixtures of water and organic solvent materials, preferably water-miscible, can also be employed. The polymerization reaction medium will include the oxidatively polymerizable monomer (and copolymerizable monomers, if any), the oxidizing agent and the polymeric counteranion material. The nature of the reaction medium (solvent) can vary depending upon the particular nature of the polymerizable monomer(s), oxidizing agent and polymeric counterion material employed. The solvent should, however, be compatible with the reactants. Where, for example, an aqueous solvent mixture is employed, care should be exercized that the solvent not be incompatible with the maintenance of the polymeric counteranion material in a dispersed condition in the reaction medium. In the case of pyrrole, a preferred oxidatively polymerizable monomer, water can be conveniently employed as the polymerization medium for the production of stable conductive polymers having improved processability.

The oxidizing agent used to effect the oxidative polymerization can include any of a variety of known oxidizing agents. Suitable oxidizing agents include those which are soluble in the polymerization reaction medium and which suitably oxidize the polymerizable monomer to a polymer having a cationic character. As used herein, a "cationic polymer" or a "polymer having a cationic character" refers to a polymer (of oxidatively polymerized monomer) wherein there is present a positive charge distributed among one or more of the repeating monomer units. Peroxygen compounds can be used, including the common inorganic peroxy-compounds such as the alkali metal and ammonium perborates, percarbonates, perchromates, monopersulfates, and monoperphosphates. Examples include sodium perborate; potassium perborate; ammonium perborate; sodium percarbonate; potassium percarbonate; potassium bichromate; alkali metal or ammonium persulfates such as potassium monopersulfate; complex per-salts such as $MHSO_4.M_2SO_4.2MHSO_3$, where M is potassium or sodium; potassium persulfate, $K_2S_2O_8$; sodium percarbonate, potassium percarbonate; and sodium monoperphosphate. Other oxidizing agents can, however, be used such as nitrous acid; perchloric acid; hydrogen peroxide; ferric chloride; diazonium salts; lead dioxide; ozone; potassium permanganate and the water-soluble organic peroxy acids of the formula

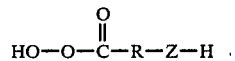

wherein R is a substituted alkylene or arylene group and Z

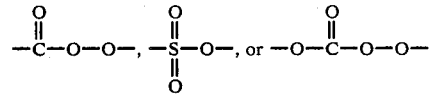

or any other group which yields an anionic group in aqueous solution, and the alkali metal salts thereof. Examples of organic peroxy-compounds are the aliphatic and aromatic percarboxylic acids and their alkali metal and ammonium salts. Among the aliphatic peracids may be mentioned peracetic acid, perpropionic acid, perlauric acid and the like. Aromatic peracids include perbenzoic acid and nuclear-substituted perbenzoic acids such as p-methoxyperbenzoic acids.

The amount of oxidizing agent utilized for the production of the conductive polymers can vary with the nature of the polymerizable monomer (or mixture of copolymerizable monomers) and with the particular oxidizing agent employed. In general, however, the molar proportion of oxidizing agent to polymerizable monomer will be in the range of from 0.005:1 to 0.5:1. The use of a proportion of about 0.005:1 or higher promotes adequate conversion of monomer to desired polymers. A proportion greater than about 0.5:1 tends to be non-economic and may promote the production of coagulum in the polymerization medium. If desired, the coagulum can be redispersed in a suitable vehicle, usually organic, for production of a coatable composition useful in the production of electrically conductive films. A preferred ratio of oxidizing agent to polymerizable monomer is from about 0.009:1 to about 0.03:1.

The dispersed phase of anionic polymer in the polymerization medium during the polymerization reaction provides the electrical neutrality for the cationic polymer Produced by the oxidative polymerization and serves an important function in conferring processability to the resulting conductive polymer. In the production of a conductive polymer of the invention, from an oxidatively polymerizable monomer such as pyrrole, thiophene or the like, the polymer having anionic surface character will comprise an integral portion of the resulting organic conducting polymer. The stoichiometry of, for example, a conductive polymer of an aromatic heterocyclic compound, can be appreciated by reference to the following formula (I) for polypyrrole (Mol. Cryst. Liq. Cryst., 1982, Vol. 83, pp. 253-264):

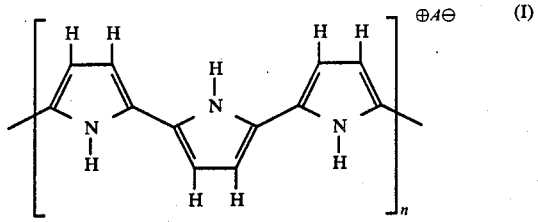

wherein $A \ominus$ represents the electrochemically stoichiometric anion and n is an integer. It will be seen from inspection of formula (I) that the relative weight of the counteranion $A \ominus$ in relation to the cationic portion will depend upon its size.

According to the present invention, the anionic portion of the conducting polymer will comprise a bulky counterion as a consequence of employing, as a counterion material during the oxidative polymerization, a polymer having anionic surface character. The polymeric counteranion comprises a major proportion by weight of the conductive polymer and markedly enhances physical properties and processability. When the counterion is, for example, a sulfonate or sulfate group on the surface of a latex particle, it will have a major influence on the final weight percent of each of the cationic and anionic portions. In general, the polymeric counterion will comprise from about 50% to about 97% by weight of the conductive polymer. Correspondingly, repeating units from the oxidatively polymerizable monomer will comprise from about 3% to about 50% by weight.

The nature of the polymer utilized as the counterion material can vary with the nature of the physical properties desired in the resulting conductive polymer. Inasmuch as the nature of the counteranion as a bulky moiety in relation to the cationic moiety will cause the counteranion to constitute a relatively large percentage (by weight) of the resulting polymer, it will be appreciated that considerable latitude will be afforded in tailoring the physical properties of a conductive polymer to the predetermined requirements of a particular application by suitable choice of the polyanionic polymeric counterion.

The polymeric counterion mterial is employed in the polymerization medium in a dispersed phase. As used herein, a dispersed phase refers to a stable dispersion or emulsion of polymer in the liquid or solvent used to conduct the polymerization of the oxidatively polymerizable monomer. The liquid can, and preferably will, be water although other solvent materials, as pointed out hereinbefore, can be used as the solvent for the polymerizable monomer. The polyanionic polymer used as the counterion material must, however, be present during the polymerization as a dispersed phase so as to assure the availability and affiliation of the cationic charges (of the oxidatively polymerized material) with the anionic surface charges of the dispersed counterion polymer, as required for the production of electrically conductive species.

A dispersed phase of polymer having anionic surface character can be conveniently provided by preparing an emulsion polymer or latex according to conventional emulsion polymerization techniques. The preparation of latices is ordinarily accomplished by polymerizing an ethylenically unsaturated monomer (or mixture of copolymerizable ethylenically unsaturated comonomers) in a suitable solvent such as water, a water-soluble hydroxylated organic solvent such as alcohol, polyhydroxy alcohol, keto alcohol, ether alcohol or the like, or in a mixture of water and such a hydroxylated solvent, such a mixture usually containing a major amount of water. The preparation of a latex will normally be accomplished by polymerization of an ethylenically unsaturated monomer (or mixture of comonomers) in the presence of a surfactant, dispersing agent, emulsifier or protective colloid, the material being present in sufficient quantity to cause formation of a stable emulsion. Suitable surfactants, emulsifiers and colloid materials used in the production of latices include cationic materials such as stearyl dimethyl benzyl ammonium chloride; nonionic materials such as alkyl aryl polyether alcohols and sorbitan monooleate; anionic materials such as sodium dodecylbenzene sulfonate, dioctyl sodium sulfosuccinate, sodium salts of alkyl aryl polyether sulfates and sodium alkyl (e.g., lauryl) sulfates; alkali metal salts of lignosulfonic acids, and silicic acids; and colloidal materials such as casein, sodium polyacrylate, carboxymethylcellulose, hydroxyethylcellulose, gelatin, sodium alginate or polyvinyl alcohol. The particular surfactant or like material employed can be varied depending upon the desired properties of the latex polymer and the nature of the polymerizable monomers thereof.

The negatively charged (polyanionic) surface character of the dispersed phase of counterion polymer can be incorporated in various ways. For example, an ethylenically unsaturated polymerizable monomer having a strong ionic group, e.g., a sulfate or sulfonate group, can be used as a polymerizable monomer in the production of the polymeric supporting electrolyte. Thus, a copolymerizable surfactant including a polymerizable ethylenically unsaturated moiety and a sulfate or sulfonate group can be polymerized by emulsion polymerization technique with an ethylenically unsaturated monomer or mixture thereof to provide a polymer latex having the anionic surface character of the sulfate or sulfonate moiety. A suitable copolymerizable monomer for this purpose is a copolymerizable short-chain vinyl sulfonate such as the sodium salt of allyl ether sulfonate (available as COPS I, Alcolac, Inc.) having the formula:

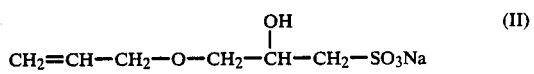

Other polymerizable monomers having an anionic group include 2-sulfoethyl methacrylate; 2-acrylamido-2-methylpropanesulfonic acid; vinylbenzene sulfonic acid; sodium vinyl sulfonate; or the salts of any of the aforementioned acids. Other polymerizable monomers capable of introducing anionic character to a dispersed phase of polymer can, however, be suitably employed.

The polyanionic surface character of the dispersed polymeric counterion material can also be the result of the utilization of an anionic surfactant (having a strong ionic character) in connection with the manufacture of the polymer by emulsion polymerization technique. Thus, a surfactant or emulsifier having, for example, a sulfate or sulfonate moiety can be employed as the surfactant or emulsifier according to known emulsion polymerization technique for the production of a latex having the anionic surface character of the anionic moiety. Any of the anionic surfactants or emulsifiers mentioned hereinbefore can be used for this purpose. It will be preferred, however, to incorporate polyanionic surface character by using a copolymerizable surfactant compound as hereinbefore described.

As mentioned previously, the physical properties of the conductive polymers of the invention will be influenced materially by the nature of the polyanionic counterion polymer and, accordingly, the comonomers utilized in the production of polyanionic polymers can be selected so as to introduce predetermined properties suited to a particular application. Thus, a variety of ethylenically unsaturated compounds can be employed to produce a polymeric counterion material, provided that surface anionic character is introduced into the polymer and provided that the counterion polymer be capable of being in a dispersed state in the medium in which the oxidative polymerization monomer is performed. Examples of such monomers include the esters of unsaturated alcohols such as vinyl alcohol and allyl alcohol with saturated acids such as acetic, propionic or stearic acids, or with unsaturated acids such as acrylic or methacrylic acids; the esters of saturated alcohols with unsaturated acids such as acrylic and methacrylic acids; vinyl cyclic compounds such as styrene; unsaturated ethers such as methyl vinyl ether, diallyl ether and the like; the unsaturated ketones such as methyl vinyl ketone; unsaturated amides such as acrylamide, methacrylamide and unsaturated N-substituted amides such as N-methyl acrylamide and N-(1,1-dimethyl-3-oxobutyl) acrylamide; unsaturated aliphatic hydrocarbons such as ethylene, propylene and the butenes including butadiene; vinyl halides such as vinyl chloride, vinyl fluoride and vinylidene chloride; esters of unsaturated polyhydric alcohols such as esters of butenediol with saturated or unsaturated acids; unsaturated acids such as acrylic acid, methacrylic acid, maleic, fumaric, citraconic or itaconic acids (or the halides or anhydrides thereof); and unsaturated nitriles such as acrylonitrile or methacrylonitrile. Other polymerizable monomers can be employed to introduce desired properties such as hydrophobicity, hydrophilicity or the like and can contain particular moieties such as silicone, fluoro, oxirane, oximino or other groups to provide properties suited to particular applications.

Preferably the counterion polymer will be prepared by emulsion polymerization and will be in the form of a latex. Utilization of a dispersed polymer, e.g., a polymeric latex that can be conveniently coated into a polymer film, contributes importantly to the production by conventional coating methods of electrically conductive polymeric films. Known emulsion polymerization techniques as described hereinbefore can be used to prepare suitable polymeric latex counterion materials. Free radical catalysts such as the peroxides, alkali metal or ammonium persulfates, azobisisobutyronitrile or the like can be used for the provision of such latices. The size of dispersed, e.g., latex, particles and the surface charge density can be varied substantially by resort to variations in the nature of the monomers employed and the conditions of polymerization, as is known by those skilled in the art. In general, polymer particles having an average particle size diameter of 50 to 500 nanometers provide good results. Other particle sizes can, however, be utilized.

A polyanionic polymer can be prepared by other techniques and can then be provided in a liquid medium as a dispersed phase. For example, a solution-polymerized polymer can be dispersed in a non-solvent material. Care should be exercised, however, in the production of a dispersion to avoid conditions promoting appreciable solubilization of the polymer in the desired dispersing medium.

The conductive polymer of the invention can be conveniently prepared by introducing the polymerizable monomer (or mixture of copolymerizable monomers) into a reaction medium containing the dispersed polymeric counterion material (e.g., a polymeric latex), followed by addition of the oxidizing agent. The reaction (polymerization) can be suitably performed under ambient conditions and the conductive polymer material can be filtered for recovery of the desired material as a coatable dispersion or latex. Other addition sequences can, however, be employed.

The conductive polymer material prepared by the method hereof can be coated onto a variety of substrate materials to provide a conducting layer or film of polymer. It will be appreciated that depending upon the particular application fo the conductive polymer film or layer, the nature of the polymeric counterion material can be varied so as to tailor the properties of the resulting conductive polymer material to the requirements of the particular application. Various adjuvants can be incorporated into the conductive polymers of the invention to provide particular and desired functionality. For example, cross-linking agents, organic surfactants, dyes or the like can be used. Such agents can be incorporated into the polymeric counterion material during the production thereof or can be introduced into the reaction medium in which the oxidative polymerization of the invention is performed or can be incorporated into the finished conductive polymer material, provided that such incorporations do not interfere or otherwise negate the desired production of an electrically conductive and processable polymeric material.

While the applicant does not wish to be bound by any particular theory or mechanism in explanation of the manner in which processable and conductive polymers are produced by the practice of this invention, it is believed that the production of conductive species is importantly related to the electrical affiliation promoted by the availability of the anionic charges on the surface of dispersed particles to cationic charges generated by the oxidative polymerization of the polymerizable monomer(s). The conductive polymer can be represented in the case of polypyrrole by the following:

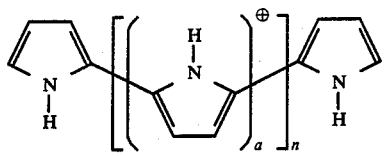

$A^{\ominus}$—Polymer (III)

wherein a is a value in the range of about two to about four, depending upon the nature of the charge distribution of the particular counteranion $A^{\ominus}$ present on the surface of the polyelectrolyte polymer and n is an integer. It will be appreciated that the presence of a plurality of $A^{\ominus}$ moieties on the surface of the polymer allows a number of such moieties to be affiliated with the illustrated cation; and it will be understood that not all anionic moieties $A^{\ominus}$ on the surface of the polymer will be in affiliation with the illustrated cation.

The invention will be further decribed by reference to the following Examples which are intended to be illustrative and non-limiting.

EXAMPLE 1

Part A—A polymeric latex having anionic surface character was prepared in the following manner employing a reaction vessel fitted with a condenser, mechanical stirrer, gas inlet (and outlet), thermometer, and dropping funnel. Water (3408 ml.) and 90 grams of a solution of copolymerizable surfactant (sodium salt of allyl ether sulfonate, 40% active, available under the tradename COPS-I from Alcolac, Inc.) were added to the reaction vessel with stirring. The contents of the vessel were purged with nitrogen and heated to 80° C. A pre-mix of the following monomers was prepared: 427 mls. ethyl acrylate; 208 mls. methyl methacrylate and 7.4 mls. methacrylic acid. To the reaction vessel, 90 mls. of the monomer pre-mix were added and the contents were heated, at 80° C., for two minutes. Potassium persulfate (90 gms.) was added and washed into the vessel using several mls. of water, as required. A latex seed was allowed to form by stirring at 80° C. for 11 minutes. The nitrogen was moved from below the surface of the liquid in the reaction vessel to the space above the surface of the liquid and a nitrogen flow rate (2–4 cc./min.) was maintained throughout the reaction. The remaining quantity of the monomer pre-mix was added dropwise at a rate such that the total addition was accomplished over a period of one hour. Temperature was maintained at 80° C. After the monomer pre-mix was added, the contents of the reaction vessel were heated at 80° C. for 45 minutes. The reaction contents were cooled to room temperature under nitrogen purge and the reaction product was filtered through cheesecloth. The polymeric latex had a solids content of 10.7% by weight and was utilized as a polymeric counterion material in the manner described in Part B of this Example.

Part B—Into a flask containing 100 mls. of the polymeric latex (10.7% solids) described in Part A of this Example, were added with stirring 3 mls. of pyrrole and 500 mgs. of potassium persulfate ($K_2S_2O_8$) The reaction was allowed to run for 15 minutes. The resulting latex polymer was cast into a film which was allowed to dry overnight in air at room temperature. The film was electrically conductive (surface resistance of about 30 megaohms/square).

Part C—The experiment described in Part B of this Example was repeated except that there was employed 100 mls. of polymeric latex obtained by diluting the starting polymeric latex (10.7% solids) 1:1 with water (to 5.35% solids). A film prepared as described in Part B of this Example showed a surface resistance of about 30 megaohms/square.

EXAMPLE 2

Part A—A polymeric latex having anionic surface character was prepared in the following manner employing a reaction vessel fitted with a condenser, mechanical stirrer, gas inlet (and outlet), thermometer, and dropping funnel. Water (2230 grams) and 228 grams of 40% active solution of sodium salt of allyl ether sulfonate (COPS-I, Alcolac, Inc.) were added to the reaction vessel and heated to 80° C. while purging with nitrogen. A pre-mix of the following monomers was prepared: 790 grams ethyl acrylate, 387.4 grams methyl methacrylate and 15 grams methacrylic acid. To the reaction vessel, at 80° C., were added 60 grams of the monomer pre-mix. The contents were stirred for five minutes at 270 rpm. A solution of 50 grams water and 40.5 grams $(NH_4)_2S_2O_8$ was added dropwise over a period of three minutes and twenty seconds. The reaction vessel contents were stirred for five minutes and the remaining portion of the monomer pre-mix was introduced dropwise over a period of 96 minutes. Seed polymer was observed to form within seconds of the first few drops of initiator solution added. The seed polymer was blue and translucent by the time the monomer addition began. When the monomer feed was completed, the reaction product was heated for 60 minutes at 80° C. The presence of some foam was observed during this time. The product was cooled to 25° C. and filtered through cheesecloth. Filtration was slow by reason of the presence of fine coagulum in the product. A latex (white in appearance and having a solids content of 34.5%) was obtained and employed in the experlment described in Part B of this Example.

Part B—A quantity of the latex prepared as described in Part A of this Example (21.87 grams) was introduced into a reaction vessel and diluted to 100 grams with water to provide a latex of 7.54% solids. To the resulting latex were added three mls. of pyrrole. Potassium persulfate (500 mgs.) was then added and the contents of the reaction vessel were stirred at room temperature. A dispersion of conductive polypyrrole was prepared. Films coated from the resulting dispersion onto glass showed surface resistance in the megaohm/square range.

EXAMPLE 3

This Example illustrates the production of a conductive polymer material from a commercially available synthetic anionic colloidal emulsion of vinyl chloride copolymer in water (Geon® 450×61 Latex, The BF Goodrich Company, Chemical Group, Cleveland, Ohio). Into a reaction vessel were added about 25 grams of the aforementioned commercially available latex (pH 5.0; 54% solids; 15 centipoise Brookfield Viscosity, Spindle No. 2, 60 rpm at 25° C.; 1.110 specific gravity). The latex was diluted to 100 grams with distilled water and three grams of pyrrole were added. The contents of the vessel were stirred for one minute. To the mixture were added 500 mgs. of potassium persulfate. The contents were allowed to stir in air. After several minutes, the reaction mixture was observed to darken. The contents were stirred for about seven additional minutes. Two aliquots of reaction product were removed and each was coated onto a glass slide. The slide prepared from the first aliquot was heated at about 100° C. for 1.5 hours. A black film showing very slight optical transmission was formed. Surface resistance was measured (54 kiloohms/square). The slide prepared from the second aliquot was allowed to dry at room temperature for several hours. A black film showing slightly greater optical transmission and having a surface resistance of about 150 kiloohms/square was obtained.

EXAMPLE 4

Conductive polymer material was prepared in the manner described in Example 3 except that 10.43 grams of the Geon® 450×61 Latex were diluted to 100 grams with water (to provide a solids content of about 5.6%). After addition of three mls. of pyrrole, the contents were stirred for several minutes and 500 mgs. of potassium persulfate added. The reaction contents were stirred at room temperature. After about two minutes, the presence of a small amount of coagulum was observed on the bottom of the reaction flask. Aliquots were taken at two minutes, nine minutes and 30 minutes. Glass slides prepared from these aliquots were dried in an oven at 100° C. to provide slightly transmissive polymer films having surface resistance in the 20–50 kiloohm/square range, depending upon coated thickness.

EXAMPLE 5

A conductive polymer material was prepared in the manner described in Example 3 except that 10.43 grams of the Geon® 450×61 Latex were diluted to 99 grams with water, and after addition of three mls. of pyrrole and stirring for three minutes, a solution of ammonium persulfate (250 mgs. dissolved in one ml. of water) was added. The reaction contents were stirred overnight. A first aliquot was taken ten minutes after the persulfate addition and was coated onto a glass slide. The slide was dried at room temperature overnight and exhibited surface resistance in the low (7–10) kiloohm/square range. A second aliquot (taken after overnight stirring) was coated onto a glass slide and dried at 100° C. in an oven. The resulting film had a surface resistance in the thickest areas of the film of about five kiloohms/square.

EXAMPLE 6

This Example illustrates the production of a conductive and processable polyaniline from aniline hydrochloride. Using the procedure described in Example 3, ten grams
of the Geon® 450×61 Latex diluted with water to 100 grams and three grams aniline hydrochloride and 250 mgs of ammonium persulfate were reacted. The reaction contents were allowed to stir for about 15 minutes A green dispersion resulted. A film was cast from the reaction product onto a glass slide and was dried at 100° C. The film was green and showed the presence on the surface a quantity of white polymer material. The film also showed discontinuities (holes) Surface resistance was about 2.5 megaohms/square.

EXAMPLE 7

The procedure decribed in Example 6 was repeated using three grams of aniline in place of the aniline hydrochloride. The reaction mixture became beige in color A transmissive tan-colored film prepared by coating a glass slide and drying the film was found to have a surface resistance about 200 megaohms/square.

What is claimed is:

1. A method for the production of a processable conductive polymer which comprises oxidatively polyermizing, in a polymerization reaction medium, an aromatic heterocyclic or aniline salt monomer oxidatively polymerizable to a cationic polymer, said reaction medium including a reaction medium-soluble chemical oxidizing agent for said oxidatively polymerizable monomer and, in a dispersed phase in said reaction medium during the polymerization and as a counteranion for said cationic polymer, a polymer having anionic surface character.

2. The method of claim 1 wherein said polymer having anionic surface character comprises polymeric latex particles.

3. The method of claim 2 wherein said polymeric latex particles include repeating units from an ethylenically unsaturated polymerizable monomer having a strong anionic group, said repeating units being sufficient to confer said anionic surface character to said polymeric latex particles.

4. The method of claim 3 wherein said anionic group comprises a sulfate or sulfonate group.

5. The method of claim 2 wherein said polymeric latex particles include an anionic surfactant therein, said surfactant being sufficient to confer said anionic surface character to said polymer latex particles.

6. The method of claim 5 wherein said surfactant has a sulfate or sulfonate anionic moiety.

7. The method of claim 1 wherein said oxidatively polymerizable monomer comprises a compound of the formula

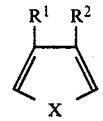

wherein each of $R^1$ and $R^2$ is independently hydrogen, alkyl aryl, alkaryl, or aralkyl, or $R^1$ and $R^2$ comprises the atoms necessary to complete a cyclic structure; and X is

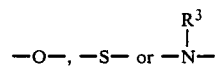

wherein $R^3$ is hydrogen, alkyl, aryl, alkaryl or aralkyl.

8. The method of claim 7 wherein X is

9. The method of claim 8 wherein $R^3$ is hydrogen.

10. The method of claim 9 wherein each of $R^1$ and $R^2$ is hydrogen.

11. The method of claim 1 wherein said oxidizing agent comprises an inorganic peroxy compound.

12. The method of claim 11 wherein said inorganic peroxy compound is an alkali metal or ammonium persulfate.

13. A method for the production of a polymeric dispersion coatable into an electrically conductive polymeric film which comprises oxidatively polymerizing, in a polymerization reaction medium an aromatic heterocyclic or aniline salt monomer oxidatively polymerizable to a cationic polymer, said reaction medium including a reaction medium-soluble chemical oxidizing agent for said oxidatively polyerizable monomer and, in a dispersed phase in said reaction medium during the polymerization and as a counteranion for said cationic polymer, a polymer having anionic surface character.

14. The method of claim 13 wherein said polymer having anionic surface character comprises polymeric latex particles.

15. The method of claim 14 wherein said polymeric latex particles include repeating units from an ethylenically unsaturated polymerizable monomer having a strong anionic group, said repeating units being sufficient to confer said anionic surface character to said polymeric latex particles.

16. The method of claim 15 wherein said anionic group comprises a sulfate or sulfonate group.

17. The method of claim 14 wherein said polymeric latex particles include an anionic surfactant therein, said surfactant being sufficient to confer said anionic surface character to said polymer latex particles.

18. The method of claim 14 wherein the polymerizable monomer is pyrrole.

19. The method of claim 14 wherein the oxidizing agent comprises an inorganic peroxy compound.

20. The method of claim 1 wherein said oxidatively polymerizable monomer comprises an aniline salt.

21. The method of claim 20 wherein said aniline salt is aniline hydrochloride.

22. The method of claim 13 wherein said oxidatively polymerizable monomer comprises an aniline salt.

23. The method of claim 22 wherein said aniline salt is aniline hydrochloride.

24. The method of claim 1 wherein said polymerization reaction medium is water.

25. The method of claim 13 wherein said polymerization reaction medium is water.

* * * * *